United States Patent [19]
Thomas et al.

[11] 3,826,143
[45] July 30, 1974

[54] FLUID PRESSURE TRANSDUCERS

[75] Inventors: Alan Thomas, Stratford-on-Avon; Ronald Alfred Heath, Harborne, both of England

[73] Assignee: Joseph Lucas (Industries) Limited, Birmingham, England

[22] Filed: Mar. 22, 1972

[21] Appl. No.: 237,024

[30] Foreign Application Priority Data
Mar. 26, 1971 Great Britain .................... 8218/71

[52] U.S. Cl. ............................... 73/398 C, 317/246
[51] Int. Cl. ............................................. G01l 9/12
[58] Field of Search ........ 73/398 C, 398 R; 317/246

[56] References Cited
UNITED STATES PATENTS
3,315,528  4/1967  Hickox ............................ 73/398 R
3,342,072  9/1967  Trekell ............................ 73/398 R
3,492,870  2/1970  Ellis ................................ 73/398 R

*Primary Examiner*—Donald O. Woodiel
*Attorney, Agent, or Firm*—Holman & Stern

[57] ABSTRACT

A fluid pressure transducer includes a body on which a bellows is mounted at one end. The other end of the bellows is connected to the free end of an elongated pivoted arm which guides the end of the bellows and prevents lateral displacement thereof. The free end of the arm is also connected to a displacement detector and by a flexible connector to an electromagnetic force applying device.

13 Claims, 9 Drawing Figures

FLUID PRESSURE TRANSDUCERS

This invention relates to fluid pressure transducers and has as an object to provide a transducer in a convenient form.

A fluid pressure transducer in accordance with the invention comprises a body, a bellows arranged so as to tend to be expanded or contracted axially by changes in the fluid pressure or pressures to be measured, means mounting one axial end of the bellows on the body, an elongated arm pivotally mounted at one end on the body and connected at its other end to the other end of the bellows to constrain said other end of the bellows to move in an arcuate path about the pivotal axis of the arm and to prevent flexing of the bellows and means flexibly coupled to said other end of the bellows for applying a balancing force thereto, and arms for producing an electrical output signal dependent on said balancing force.

Reference is now made to the accompanying drawings in which.

Figure 1:
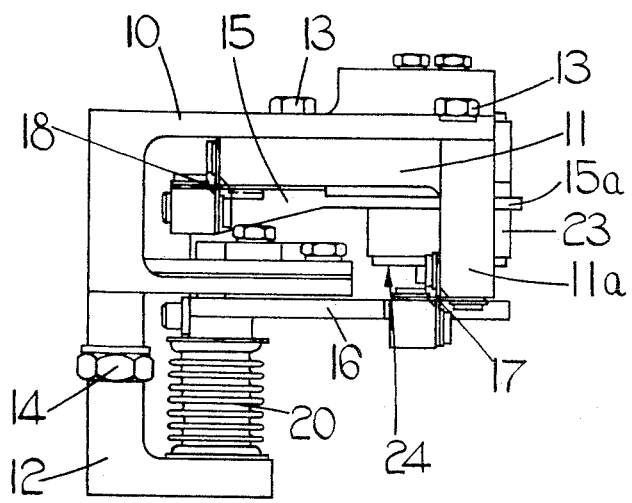
FIG. 1 is a side elevation of an example of a fluid pressure transducer in accordance with the invention.
Figure 2:
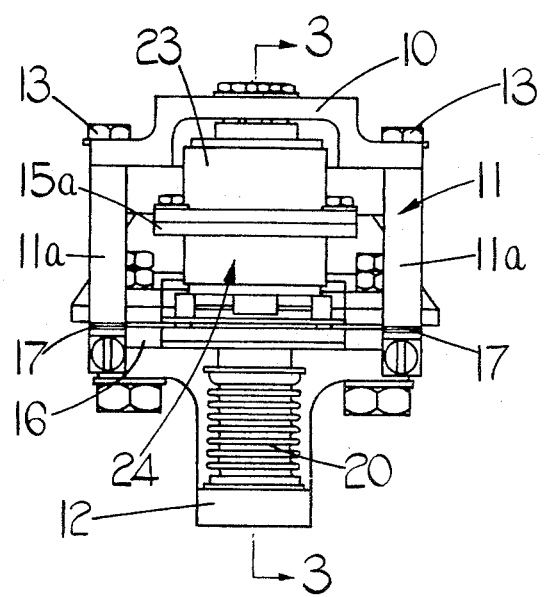
FIG. 2 is an end elevation of the transducer.

The transducer shown includes a body in three basic parts namely a main frame 10, a hinge bracket 11 and a bellows mounting bracket 12, the brackets 11, 12 being attached to the main frame by bolts 13, 14 respectively. The bracket 11 is of bifurcated form and terminates at one end in a pair of spaced parallel legs 11a. The bracket bifurcated 11 serves to provide a pivotal support for a lever 15 and an elongated bifurcated arm 16. The two ends of the arm 16 are pivotally connected to the two legs 11a by means of known crossed leaf spring type hinges 17. Similar hinges 18 connect the lever 15 to the opposite end of the bracket 11, so that the lever 15 and the arm 16 are pivotable about spaced parallel axes. The free end of the arm 16 is connected to the lever 15 by means of a flexible metal connecting strip 19. The length of the arm 16 is substantially greater than the length of that arm of the lever 15 to which the strip 19 is connected.

The bracket 12 has one end of a flexible, resilient metal bellows 20 connected to it through the intermediary of a plug 21 sealingly fitted in the end of the bellows. A similar plug 22 is sealingly fitted in the other end of the bellows 22 and is secured to the arm 16 adjacent its free end. The bellows is evacuated and thus is sensitive to the pressure of any fluid, e.g., air, by which it is surrounded in use. The arm 16 serves to stabilise the bellows 20 by preventing lateral vibration of the said other end thereof which would occur if the bellows plug 22 were connected only to the flexible strip 19. The length of the arm is such that the limited displacement permitted to the plug 22 (as will hereinafter become apparent) does not cause flexing of the bellows sufficient to bring about any significant change in the effective spring rate thereof.

Figure 3:
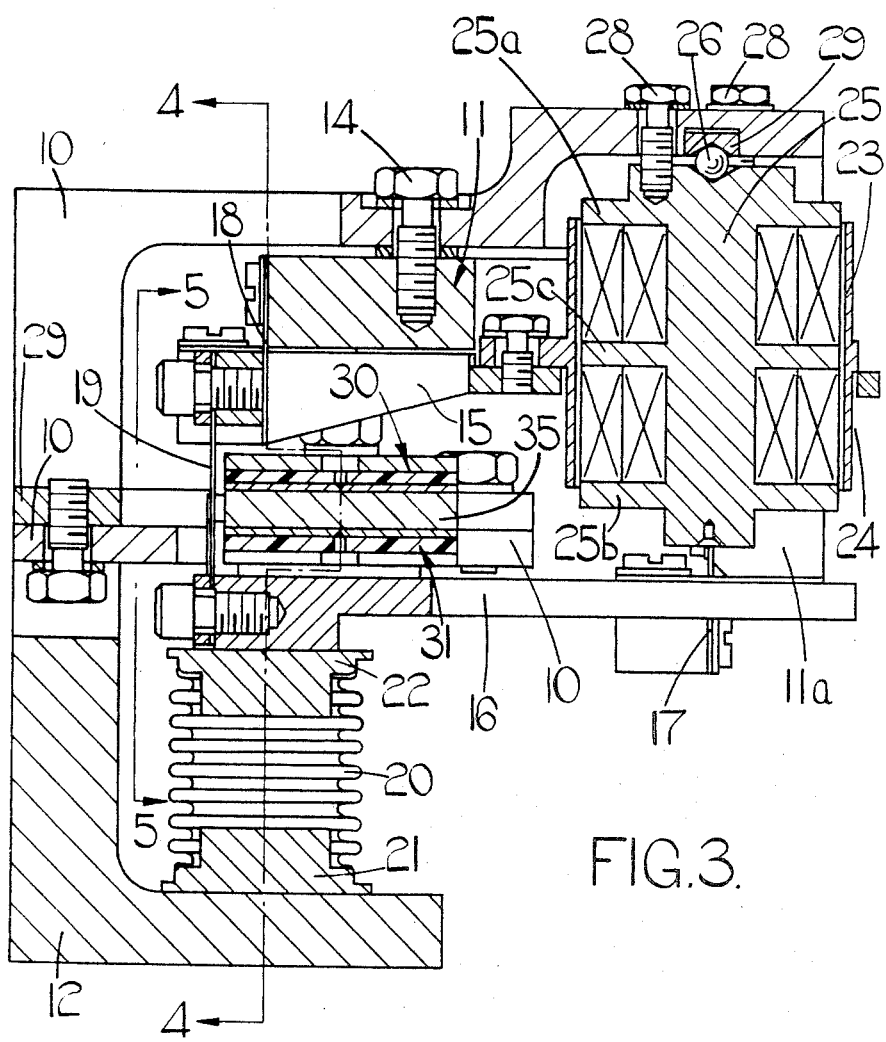
FIG. 3 is an enlarged section on line 3—3 in FIG. 2.
Figure 4:
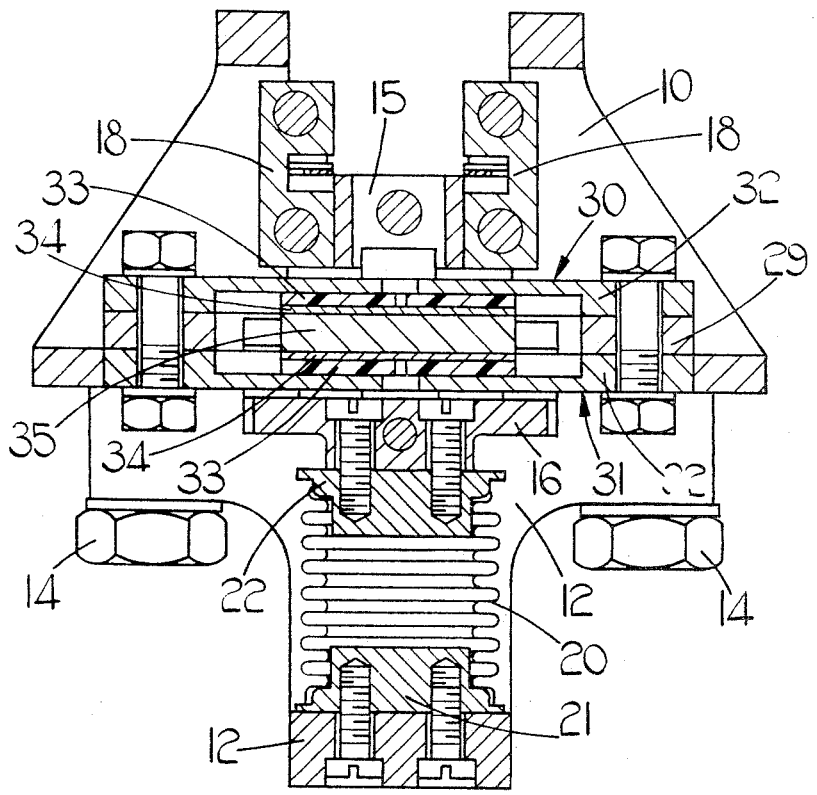
FIG. 4 is a section on line 4—4 in FIG. 3.
Figure 5:
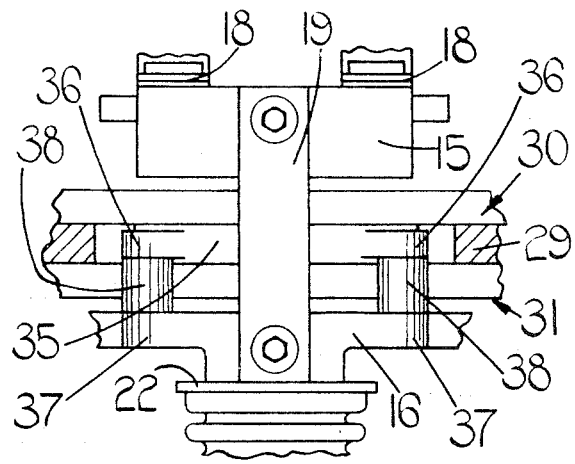
FIG. 5 is a fragmentary section on line 5—5 in FIG. 3.
Figure 6:
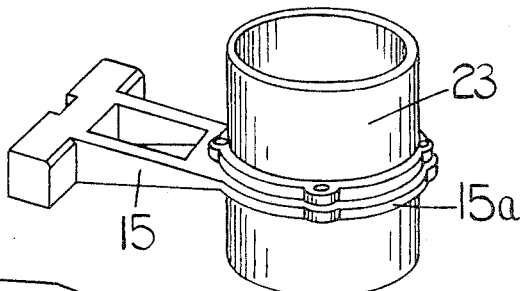
FIG. 6 is a perspective view of part of an electromagnetic force applying device included in the transducer.
Figure 7:
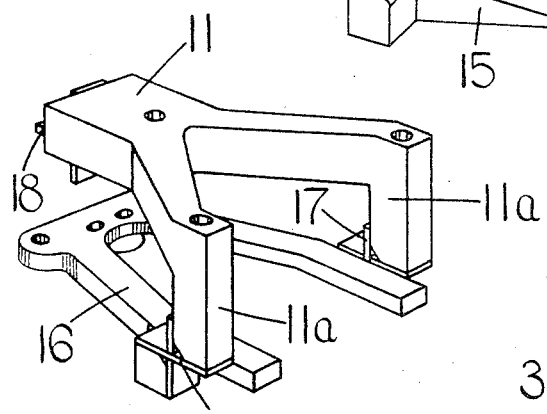
FIG. 7 is a perspective view of part of a bellows stabilizing arrangement included in the transducer.

The lever 15 has its shorter arm connected, as above described to the strip 10. Its longer arm terminates in an annular ring 15a which surrounds a tubular armature 23 of the force applying device 24. The ring 15a has lugs which are aligned with and bolted to corresponding lugs on the armature 23. The device 24 includes a core 25 adjustably mounted on the main frame 10. As shown in FIG. 3 a ball 26 is engaged in opposed conical recesses in one end of the core 25 and an insert 27 fitted in the frame 10. Arranged at equi-angularly spaced positions around this ball are three bolts 28 the shanks of which pass freely through holes in the frame and are screw-threadedly engaged with the core 25. Varying of the relative tightness of the bolts 28 causes changes of the orientation of the axis of the core 25 about the ball 26. The core 25 is basically in the form of a spool having end flanges 25a, 25b and an intermediate flange 25c. The core bears two windings in each of the two annular recesses defined between the flanges. One winding is wound in the same sense in both recesses and these two portions of this winding are connected in series. The two portions of the other winding are also connected in series with one another but are wound in opposite senses.

The first mentioned winding has a constant current passed through it in use and serves to polarise the core 25 magnetically. The other winding has a variable current passed through it as will be hereinafter explained. As a result the flux in the gaps between the flanges 25a and 25b will differ by an amount dependent on the magnitude and direction of the variable current and an axial force dependent on the variable current will be applied to the armature 23, thus applying a moment to the lever 15.

Figure 8:
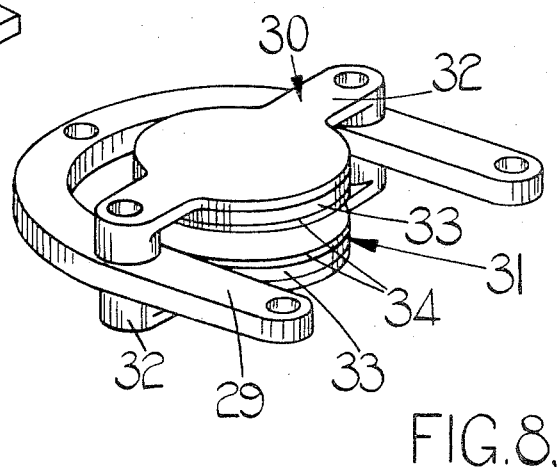
FIG. 8 is a perspective view of a capacitor plate mounting arrangement included in the transducer.

Mounted on the frame 10 is the capacitor plate mounting arrangement shown in FIG. 8. This arrangement includes a flat U-shaped member 29 which provides a spacer between two spaced parallel capacitor plate assemblies 30 and 31. Each such assembly comprises a backing plate 32, an insulating disc 33 on the backing plate and a conductive disc 34 on the insulating disc. The discs 34 form the actual capacitor plates and have electrical connections (not shown) to them. The two discs 34 have planar surfaces which are parallel and spaced apart in the direction in which the plug 22 is movable.

A further capacitor plate 35 is disposed between the discs 34 and is mounted on the arm 16. To this end the plate 35 and the arm 16 have lugs 36, 37 between which electrically insulating spaces 38 are mounted. In order to centralise the plate 35 exactly when calibrating the transducer various shims can be inserted between the U-shaped member 29 and the frame 10 or either of the plate assemblies 30.

Figure 9:
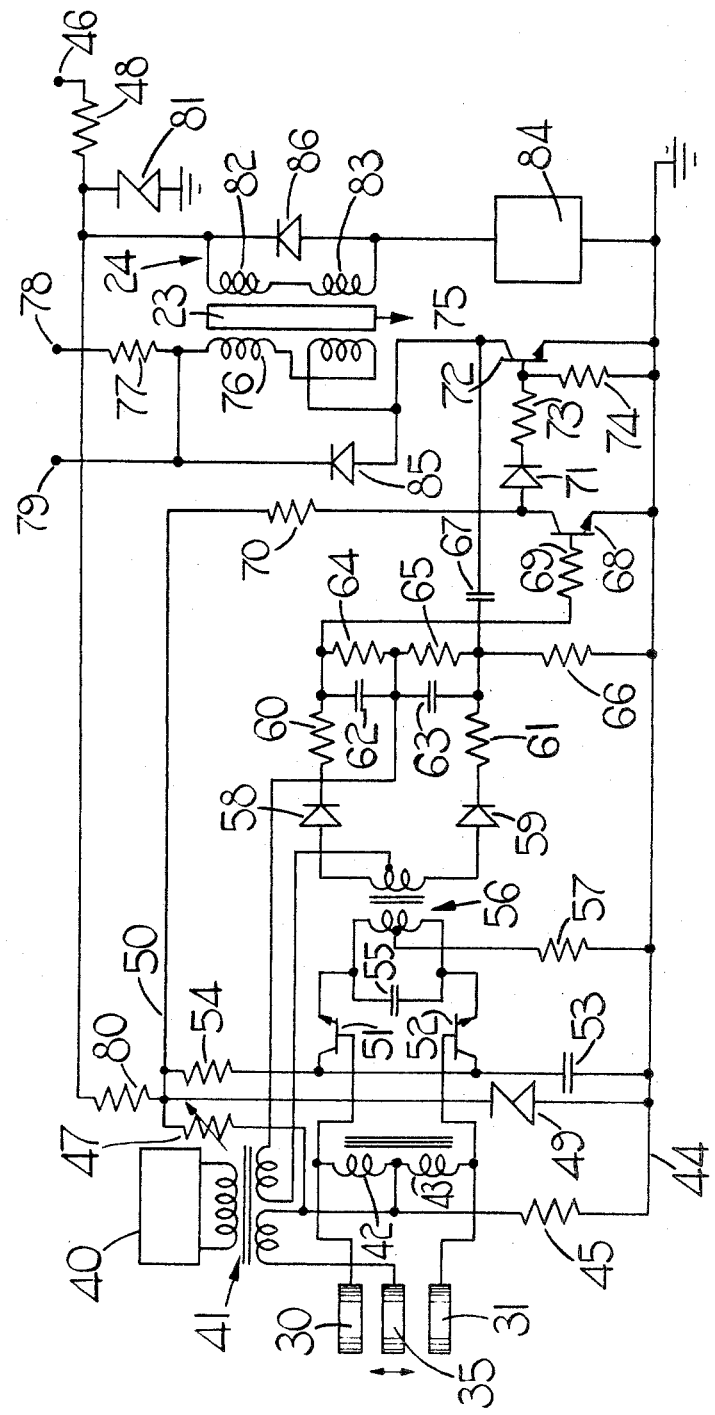
FIG. 9 is an electrical circuit diagram of the transducer.

Turning now to FIG. 9 the plates 30, 31 and 35 form two capacitors in adjacent arms of a radio frequency resonant a.c. bridge circuit. An oscillator 40 is coupled by a transformer 41 to plate 35 and the interconnection of two inductors 42 and 43 respectively. The other ends of these inductors are connected respectively to the disc 34 of the plates 30 and 31, and also provide the output terminals of the bridge. The interconnection of the two inductors 42, 43 is also connected to an earth rail 44 via a resistor 45 and to a rail 50 via a variable resistor 47. The rail 50 is connected via a resistor 48 and 80 in series to the positive terminal 46 of a d.c. supply. A zener diode 49 has its cathode connected to the rail 50 and its anode connected to the rail 44 so that a known d.c. voltage level dependent on the setting of the variable resistor 47 is applied to the interconnection of the inductors 42, 43.

A radio-frequency amplifier stage consisting of a pair of n.p.n. transistors 51 and 52 with their bases connected to the outer ends of the inductors 42, 43 and with their collectors interconnected and connected to the rail 44 by a capacitor 53 and to the rail 50 by a resistor 54, is provided for amplifying the output of the bridge. The emitters of these two transistors are interconnected by a capacitor 55 in parallel with the primary winding of a transformer 56. This primary winding has a centre tapping connected via a resistor 57 to the rail 44.

The secondary winding of the transformer 56 drives a phase-discrimination circuit. This secondary winding has a centre tapping connected to a further secondary winding of the transformer 41. A pair of diodes 58, 59 have their anodes connected to the two ends of the secondary winding of transformer 56 and their anodes connected to resistors 60, 61 respectively. The resistors are connected to two capacitors 62, 63 in series, each capacitor having a resistor 64, 65 in parallel with it. The interconnection of the capacitors 62, 63 is connected to said further secondary winding of the transformer 41 to supply a phase reference signal to the phase discrimination circuit.

In operation the capacitors 63, 62 will be charged during alternate half-cycles of the supply from the transformer 41. When the bridge circuit is in balance there will be no a.c. signal from the transformer 56 into the phase discriminator circuit. Thus both capacitors 62, and 63 will be charged equally and in opposite senses so that there will be no output from the phase discriminator circuit. When the plate 35 is displaced in one direction the bridge circuit will produce an output in phase with the supply and in this case the additive effect of the two a.c. signals in the phase discriminator circuit will cause the one of the capacitors 62, 63 to hold a greater charge than the other so that a d.c. output of one polarity is obtained. Similarly a c.c. output of opposite polarity is obtained when the plate 35 is displaced in the opposite direction to cause the bridge circuit to produce an output 180° out of phase with the supply.

The output of the phase discriminator circuit is amplified used to drive the force applying device 24. To this end the interconnection of the resistors 61 and 65 is connected to the rail 44 either through a resistor 66 as shown or directly. Where the resistor 66 is employed a capacitor 67 also has one plate connected to this interconnection. The interconnection of the resistors 60 and 54 is connected to the base of an n.p.n. transistor 68 via a resistor 69. The emitter of transistor 68 is connected to the rail 44 and its collector is connected via a resistor 70 to the rail 50. The collector of transistors 68 is also connected to the anode of a diode 71 which has its cathode connected to the base of an n-p-n transistor 72 via a resistor 73. A resistor 74 connects the base of the transistor 72 to the rail 44 and the emitter of transistor 72 is also connected to the rail 44. The other plate of the capacitor 67 when this is used, is connected to the collector of the transistor 72, which is also connected to one end of the series connected reverse wound pair of windings 75, 76 of the device 24. The other end of this pair of windings is connected by a resistor 77 to the terminal 46 via the resistor 48. The output terminals 78, 79 of the circuit are connected to opposite ends of the resistor 77. The voltage across the series circuit consisting of the resistor 77, the windings 75, 76 and the collector-emitter path of the transistor 72 is stabilized by a zener diode 81 which has its anode earthed and its cathode connected to the terminal 78.

The other windings 82, 83 of the device 24 are connected in series between terminal 78 and a constant current source 84. A diode bridges the windings 75, 76 and a further diode 86 bridges the windings 82, 83 so as to protect the circuit against any high e.m.f's, which may be induced when the current flowing through the windings is interrupted.

As mentioned above the magnitude and polarity of the voltage appearing across the resistors 64 and 65 of the discrimator circuir depends upon the magnitude and direction of the displacement of the centre plate 35 from its null position (in which the bridge is balanced). Since, however, the bellows 20 is evacuated it is only necessary in practice for the device 23 to apply a force in one direction, namely downwardly on the lever 15 as viewed in FIG. 3. It will be seen, therefore, that when there is no signal (i.e., when the bridge circuit is balanced) or when there is a signal of negative polarity on the base of the transistor 68, this will be non-conductive and there will be a maximum signal, determined by the resistors 70m, 73 and 74, on the base of the transistor 72. Thus a maximum current flows through the windings 75, 76 urging the armature 23 downwardly and applying an upward pulling force to the upper end of the bellows 20. As the upward displacement of the plate 35 increases, the current through transistor 68 increases and the current through the windings 75, 76 decreases. In equilibrium the plate 35 occupies a position in which the force applied to the bellows 20 by the device 24 is equal and opposite to the sum of the forces arising from the external pressure on the bellows and its own resilience. The force is, in fact, directly proportional to the current flow through windings 75, 76 and the output voltage across the resistor 77 is thus directly proportional to the current. There is thus a linear relationship between the output of the transducer and the pressure sensed.

The loop gain of the system described is such that only a minute displacement of the plate 35 is required to cover the whole range of pressure to be sensed by the device. Thus the maximum displacement of the plate 35 may be up to one-tenth of the width of the air gaps which exists between the plate 35 and the two discs 34. Thus any changes in the dielectric constant of the air surrounding the plate 35 due to changes of pressure, temperature or humidity have a negligible effect on the operation of the transducer. Similarly the effect of displacement of the armature 23 on the force applied is also negligible.

The resistor 66 and the capacitor 67 are included, if needed to stabilize the system. These components operate in known manner to provide a negative feed back to transistor 68 which varies with the rate of change of the input signal to the transistor 68.

In modifications of the invention the bellows may receive the pressure to be measured internally or, where a pressure difference is to be measured differing pressures may be applied externally or internally.

We claim:

1. A fluid pressure transducer comprising a body, a bellows disposed for axial expansion and contraction by changes in the fluid pressure to be measured, means mounting one axial end of the bellows on the body, an elongated arm pivotally mounted at one end of the body and connected at its other end to the other end of the bellows to constrain and guide the other end of the bellows to move in an arcuate path about the pivotal axis of the arm and to prevent flexing of the bellows, means coupled to said arm for detecting displacement of said arm, a force applying means responsive to the displacement detected by said displacement detecting means for generating a controllable balancing force, separate lever means of a length shorter than that of said elongated arm flexably coupled to said other end of the bellows, said force applying means being coupled to said lever means so as to displace same to thereby apply the balancing force to the bellows, and means responsive to said force applying means for producing an electrical output signal dependent on said balancing force.

2. A transducer as cliamed in claim 1 in which said lever is coupled to the bellows by a flexible metal connecting strip.

3. A transducer as claimed in claim 1 wherein said means for detecting displacement of said arm includes a movable part mounted on said arm and provides an electrical output controlling a supply of current to the force applying means, said force applying means comprising an electromagnetic device.

4. A transducer as claimed in claim 3 in which said displacement detecting means comprises a differential capacitor having a pair of plates fixedly mounted on the body and a plate mounted on said arm and disposed between said pair of plates.

5. A transducer as claimed in claim 4 in which the two fixedly mounted capacitor plates are in the form of plane metal discs attached respectively to backing plates through the intermediary of interposed discs of insulating material.

6. A transducer as claimed in claim 5 in which the backing plates are mounted on a spacer member secured to the body.

7. A transducer as claimed in claim 6 in which said spacer member is of U-shaped configuration and the backing plates bridge the limbs of said spacer member on opposite sides.

8. A transducer as claimed in claim 4 in which said fixed and movable plates form two capacitors in adjacent arms of a radio frequency resonant a.c. bridge circuit.

9. A transducer as claimed in claim 1 in which said force applying means is an electromagnetic force applying device and includes a core mounted on the body, and having a pair of recesses therein, a first pair of windings in the recesses respectively wound in the same sense and connected in series, a second pair of windings in the recesses respectively wound in opposite senses and connected in series and an armature mounted on said lever and surrounding the core.

10. A transducer as claimed in claim 9 in which the core is adjustably mounted on the body.

11. A transducer as claimed in claim 10 including a ball interposed between conical recesses in one end of the core and an adjacent part of the body, and a plurality of screws engaged between the body and the core at positions spaced around the ball, the orientation of the core being variable by adjusting the relative tightness of the screws.

12. A transducer as claimed in claim 1 in which the body includes a hinge bracket to which said elongated arm and said lever means are both pivotally connected.

13. A transducer as claimed in claim 12 in which the lever means and said arm are pivotally connected to the hinge bracket by crossed-leaf spring hinges.

* * * * *